Figure 1:
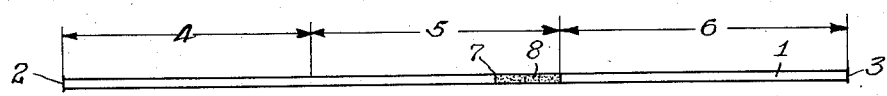

Jan. 21, 1936.  H. C. EGLOFF  2,028,504
STEAM GENERATOR OF THE ONCE THROUGH TYPE
Filed Jan. 24, 1934  3 Sheets-Sheet 1

INVENTOR
Hans Conrad Egloff
BY
Pennie, Davis, Marvin & Edmonds
ATTORNEYS

Jan. 21, 1936.  H. C. EGLOFF  2,028,504
STEAM GENERATOR OF THE ONCE THROUGH TYPE
Filed Jan. 24, 1934  3 Sheets-Sheet 2

INVENTOR
Hans Conrad Egloff
BY
Jennie Davis, Maurine Edmonds
ATTORNEYS

Jan. 21, 1936.     H. C. EGLOFF     2,028,504
STEAM GENERATOR OF THE ONCE THROUGH TYPE
Filed Jan. 24, 1934     3 Sheets-Sheet 3

Inventor
Hans C. Egloff,
By Pennie Davis Marvin Edmonds
Attorney

Patented Jan. 21, 1936

2,028,504

UNITED STATES PATENT OFFICE 2,028,504

STEAM GENERATOR OF THE ONCE THROUGH TYPE

Hans Conrad Egloff, Winterthur, Switzerland, assignor to the firm of Sulzer Frères Société Anonyme, Winterthur, Switzerland Application January 24, 1934, Serial No. 708,035
In Switzerland November 15, 1933

4 Claims. (Cl. 122—379)

This invention relates to the removal of solid impurities from the tube or tubes of water-tube steam generators of the "once-through" type, that is to say of the type in which liquid medium supplied to the inlet end of at least one tube is converted therein to steam which is delivered from the outlet end of the tube to the point or points of consumption.

It has hitherto been proposed constantly to supply to a water-tube steam generator feed water in excess of the quantity which is evaporated, this excess being, after separation from the steam, discharged. The degree of excess of feed water then corresponds to the quantity and nature of the injurious ingredients contained in the feed water, the excess being such that during the passage of the water through the generator all the said ingredients are maintained in solution and, even after passing through the generator these ingredients are held in solution in the excess water which is separated from the steam and discharged. The excess water carrying the ingredients is therefore not in any way employed within the generator for the generation of steam. Since the quantity of excess water necessary to maintain all the undesirable ingredients in solution is considerable the heat absorbed in bringing this excess water to the temperature of evaporation is constantly wasted unless complicated heat exchange apparatus is provided for recovering this energy. The present invention has for its object to provide an improved method and means for removing solid impurities without involving the above difficulty.

To this end according to the present invention the zone in which the impurities are precipitated within the tube is temporarily advanced by increasing the feed in such a way that the impurities precipitated in a preceding zone or adhering to the tube walls in normal service can be washed off and carried away by means of the increased feed or by the liquid working medium during the time when the precipitating zone is advanced. in this way unnecessary waste of heat is avoided since during normal working of the generator no liquid is discharged, the undesirable solid ingredients or precipitate being allowed to settle and then discharged only at intervals by temporarily increasing the supply of liquid medium so as to wash away solid material which has been precipitated during normal working of the generator.

A water tube steam generator for carrying out this method may comprise means for maintaining a constant supply of liquid working medium to the tube and means for temporarily supplying additional liquid working medium in excess of the constant supply. Thus, for example, the generator may be furnished with a main feed pump for maintaining a constant supply of liquid working medium to the tube and means for temporarily increasing the quantity of liquid medium fed from the pump to the tube. Alternatively an auxiliary pump may be provided in addition to a main feed pump and adapted to supply additional liquid working medium to the tube, means being then provided for temporarily rendering the auxiliary pump operative.

In the accompanying drawings—

Figure 4:
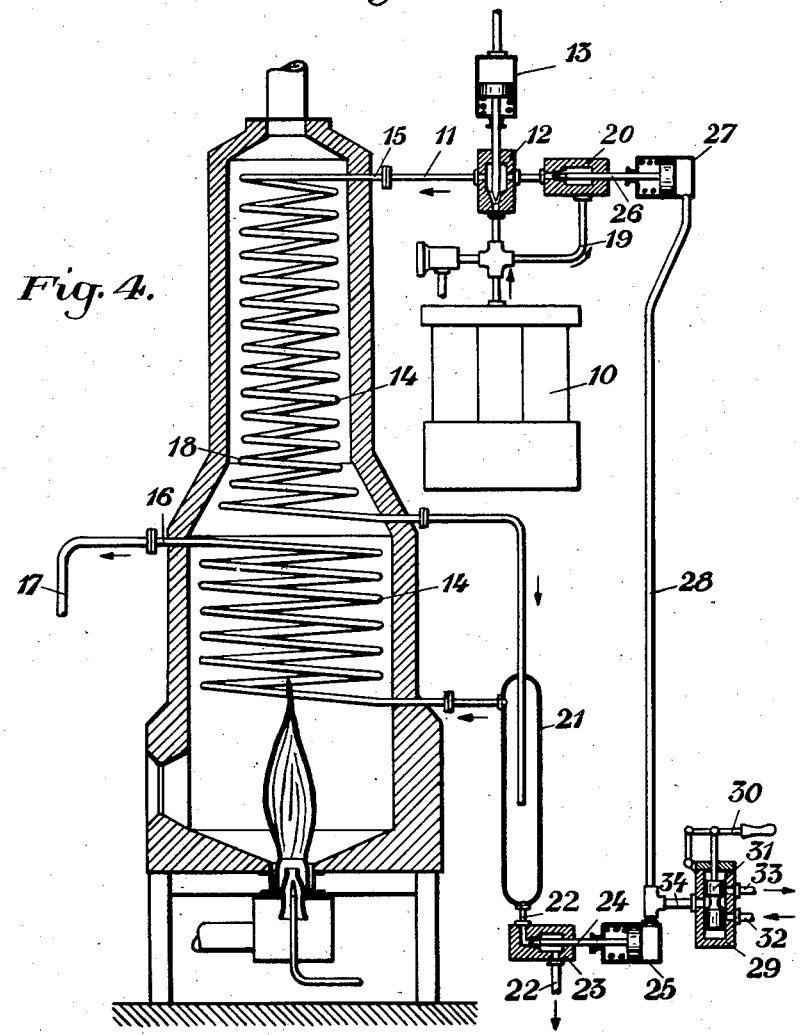
Figure 2:
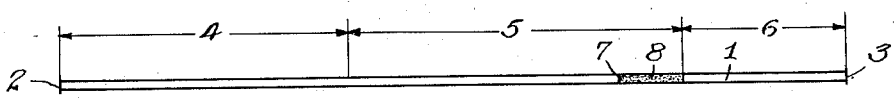
Figure 3:
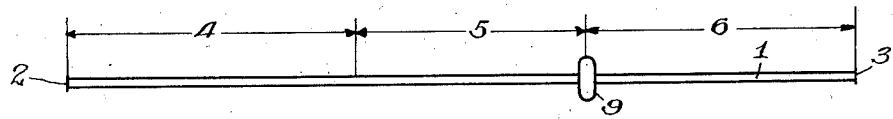
Figure 5:
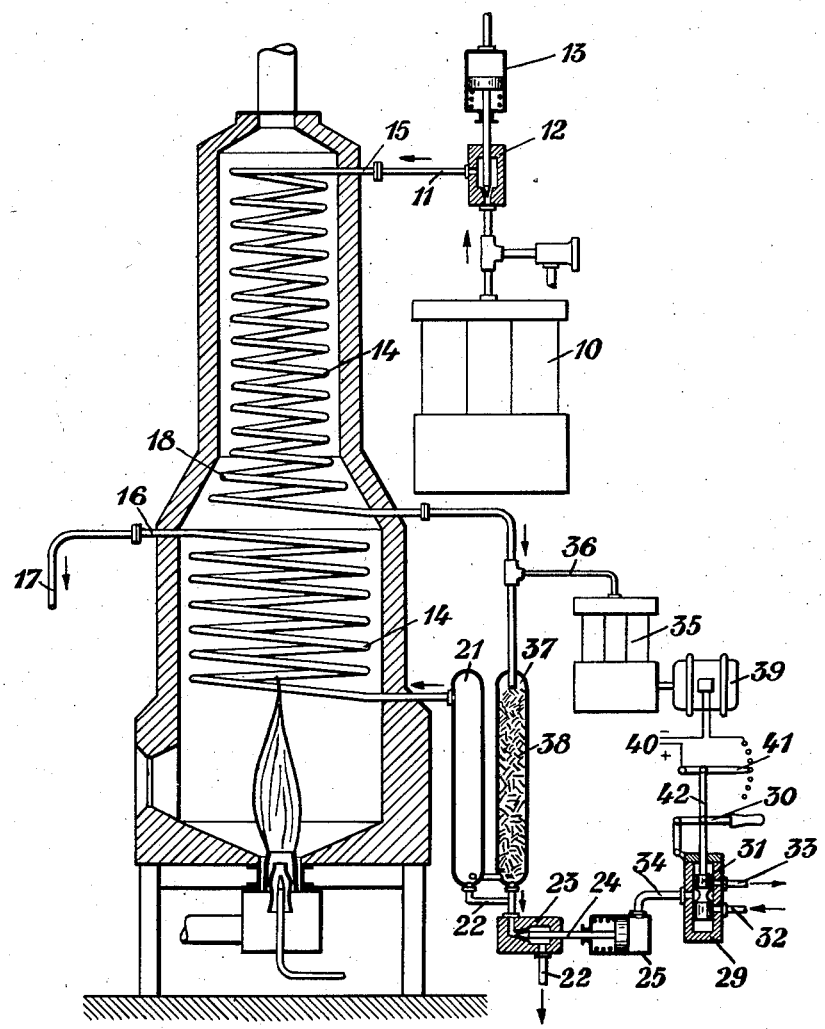
Figure 6:
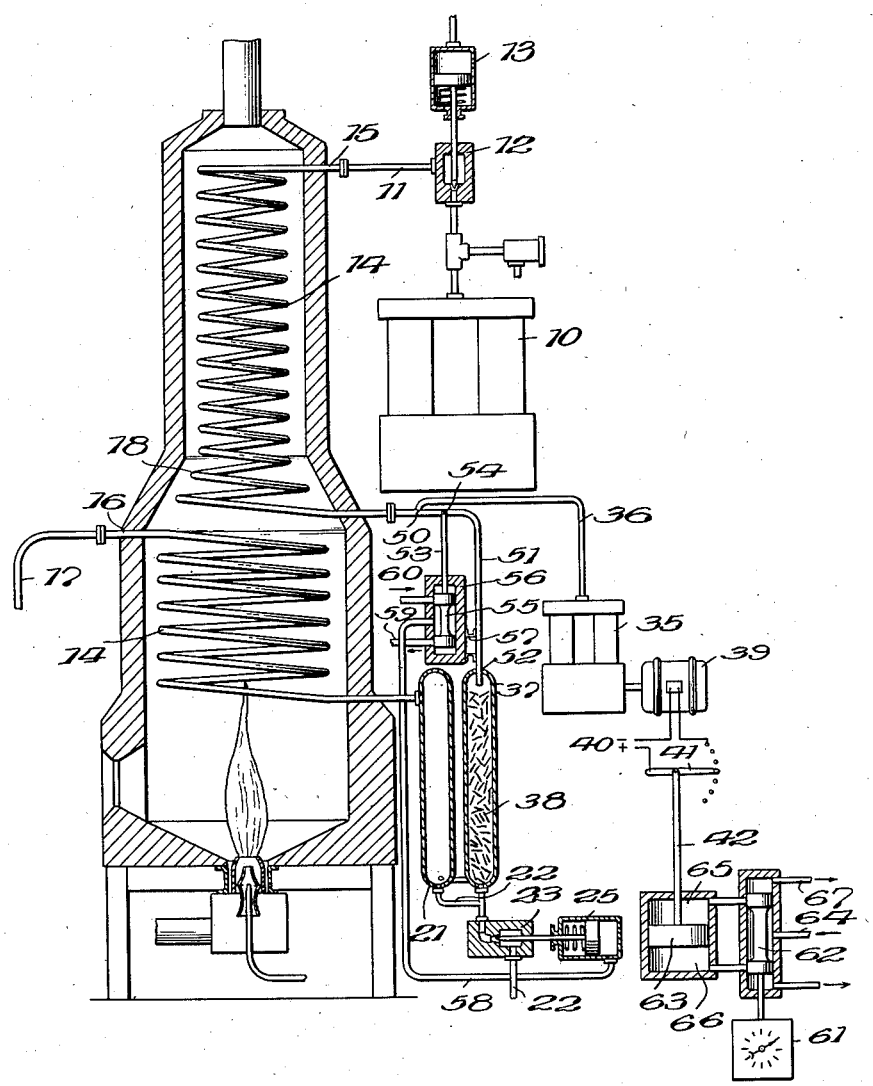

Figures 1 and 2 diagrammatically illustrate respectively the precipitation zones within a water tube with a normal supply of working medium and when such normal supply is supplemented, Figure 3 illustrates, also diagrammatically, one way in which the invention may be applied to remove the precipitate, Figure 4 shows in vertical section one construction of water tube steam generator embodying the present invention, Figure 5 is a similar view of a modified construction also according to the invention, and Figure 6 is a similar view showing a further modified form of the invention.

Referring to Figures 1, 2 and 3, the tube 1 in each case has liquid working medium fed to its inlet end 2, superheated steam being delivered from the outlet end 3. In Figure 1 the liquid working medium is heated to the evaporation temperature in the zone 4, is evaporated in the zone 5 and superheated in the zone 6. In the evaporation zone 5 the liquid content of the working medium constantly decreases so that at the point 7 the liquid content is insufficient to maintain all impurities in solution so that they commence to be precipitated in the form of crystals or grains, precipitation taking place over the zone 8.

Figure 1 shows the position of the precipitation zone 8 for normal working of the generator, that is to say with the normal supply of working medium and heat. If now the quantity of liquid working medium supplied to the tube 1 is increased to a value above that which is evaporated by the normal heat supply, both the heating zone 4 and the evaporation zone 5 will be lengthened since a larger quantity of heat is necessary for the preliminary heating and evaporation of the increased quantity of working medium. The precipitation zone 8 will therefore be also advanced to the position shown in Figure 2, that is to say the zone 8 will be nearer to the outlet end 3 than in Figure 1. The medium flowing through that part of the tube shown in Figure 2 corresponding to the zone 8 in Figure 1 will then be in liquid form. By arranging in the pipe 1 between the zones 8 shown in Figures 1 and 2 a trap 9 the precipitate which during normal working of the generator has settled in the zone 8 shown in Figure 1 will be washed from this zone by liquid medium but will be held back and thus, in effect, drawn out by the trap 9. Normal operation of the generator can then be resumed, i. e. the quantity of feed water can be restored to the normal constant value.

In the construction illustrated in Figure 4 feed water is supplied by a pump 10 to the generator through a supply pipe 11, the supply of water from the pump 10 to the pipe 11 being controlled by a device 12 operated by a servo-motor 13. The inlet end 15 of the water tube 14 communicates with the supply pipe 11, superheated steam being delivered from the outlet end 16 of the tube through a pipe 17 to the point or points of consumption.

At or about the zone 18 of the tube 14 the liquid content of the working medium has, with the normal supply of working medium, fallen to such a value that impurities commence to be precipitated in the form of solid ingredients such as granules or crystals. These impurities tend to adhere to the inner surfaces of the tube and thus endanger the tube since they reduce the conductivity of the walls and undesirably high temperatures may therefore result.

With a view to overcoming this difficulty, liquid working medium in excess of that normally fed to and evaporated within the tube 14 is supplied at intervals through a subsidiary pipe 19, the supply of additional working medium from the pipe 19 being controlled by a valve 20. The supply of this additional liquid working medium results in the zone 18 in which precipitation occurs during normal operation of the generator being, in effect, advanced towards the outlet end of the tube, i. e. to or beyond the trap or separator 21 from which the impurities which may be partly in solution and partly in suspension in the liquid in the unevaporated or liquid portion of the medium can be discharged through a pipe 22.

The discharge of liquid through the pipe 22 is controlled by a needle valve 23 the needle 24 of which is controlled by a servo-motor 25. The needle 26 of the valve 20 is similarly controlled by a servo-motor 27, pressure medium being supplied to both the servo-motors 25 and 27 through a pipe 28 from a control device 29. The control device 29 comprises an operating handle 30 connected to a piston valve 31 adapted to control the flow of pressure medium from an inlet pipe 32 through a pipe 34 to the pipe 28 and also the discharge of pressure medium from the pipe 28 through the pipe 34 to a discharge pipe 33.

During normal working of the generator the handle 30 and therefore the piston valve 31 are in their lowermost position in which pressure medium is admitted from the pipe 32 through the pipe 34 and pipe 28 to the servo-motors 25 and 27. In this way both the needles 24 and 26 are in the positions in which they close the valves 23 and 20 so that no additional working medium flows through the pipe 19 and there is no discharge from the trap 21 through the pipe 22.

Solid ingredients now tend to settle out in the zone indicated at 18 and in order to remove these ingredients the lever 30 is raised so that pressure medium is discharged from the servo-motors 25, 27 through the pipes 28, 34 and 33. In this way the valve 20 is opened and additional liquid working medium flows from the pipe 19 through the pipe 11 to the tube 14 thereby advancing the zone of precipitation to or beyond the trap 21 and washing the solid matter precipitated during normal working in the zone 18 into the trap. Simultaneously with the opening of the valve 20 the valve 23 is opened so that the solid ingredients together with the unevaporated or excess liquid medium will be discharged from the trap 21 through the pipe 22.

The generator illustrated in Figure 5 is intended for particularly high output, the speed of the working medium in its passage through the tube being so high that only a part of the solid ingredients is likely to adhere to the tube walls, that is to say, the high speed of flow of the medium through the tube especially at the zone 18 of precipitation would normally cause the greater part of the solid ingredients to be swept with the steam through the superheating zone and to the point or points of consumption. With a view to preventing this, a trap 37 is arranged between the zone 18 of precipitation and the superheating zone, the trap being furnished with baffles or filtering material 38 on which the impurities will tend to settle due to the reduced speed of flow of the medium through the trap.

In this construction the quantity of liquid medium fed to the tube 14 is not increased by the feed pump 10 itself but by an auxiliary pump 35 which can deliver working medium through a pipe 36 to the tube 14 on the inlet side of the filter 38. The auxiliary pump 35 is driven by an electric motor 39 to which power is supplied from electric mains 40. The motor 39 is controlled by a rheostat 41 operatively connected by a spindle 42 to the hand lever 30.

The lever 30 is normally in its lowermost position when pressure medium is supplied from the pipe 32 through the pipe 34 to the servomotor 25 thus maintaining the valve 23 in its closed position. At the same time the rheostat 41 is in its lowermost position in which the motor 39 is inoperative.

For removing precipitate from the medium flowing through the tube the lever 30 is temporarily raised so that the pressure medium contained in the servomotor 25 will be discharged through the pipes 34 and 33 whereby the valve 23 will be opened, and the rheostat 41 moved so as to set the motor 39 in operation. The pump 35 now delivers additional liquid working medium to the tube 14 this additional medium flowing through the filter 37 and carrying away the solid matter which has been trapped during normal working. The precipitate is discharged from the lower end of the filter 37 and from the separator 21 through the valve 23 and pipe 22. The separator 21 prevents the additional working medium delivered from the pump 35 from being carried away to the superheater.

The construction described is intended as an example of a construction of the subject matter of the application. Details can also be constructed differently, for example, as shown in Fig. 6, the drawing off out of the liquid separator can be regulated in dependence on the steam temperature. Between the introduction point 50 of the additional working medium in the pipe 51 and the introduction point 52 in the vessel 37 there is arranged a rod 53 made of inextensible metal, which is connected at the point 54 to the pipe 51 and at the opposite end to the control valve 55. The casing 56 of the control valve is fastened at the point 57 to the pipe 51. The tube-length between the points 54 and 57 will now expand more or less in proportion to the steam temperature. As however the rod 53 is insensitive to heat, the valve 55 is displaced in the casing 56 in such a way that at low temperature the pressure space of the servomotor 25 is connected with the discharge pipe 59 via the pipe 58, so that the valve 23 is opened and liquid from both the liquid separator 21 and from the vessel 37 can flow off along with the redissolved salts towards the discharge pipe 22. If however, the temperature rises, a connection is formed between the servomotor 25 and the feed pipe 60. The pressure liquid then flows via the pipe 58 into the servomotor and closes the valve 23. The control valve 55 and the casing 56 must be so adjusted in their reciprocal position that the draw-off pipe 22 is opened when the steam temperature falls nearly to, or to the temperature of the saturated steam.

Means can also be provided to change from time to time the quantity of liquid, which flows into the steam generator, automatically, instead of by hand, as described. For example there can be provided a control valve 62 governed by a clock 61, which influences automatically the piston 63 of a servomotor at definite times. The valve 62, normally, is held by the clock 61 in its upper position, so that a connection exists between the feed pipe 64 and the cylinder space 65 above the piston 63 and the pressure liquid fed through the pipe 64 moves the rod 42 and the rheostat 41 downward. The current feed through the conductor 40 to the motor 39 is thereby interrupted, the pump 35 stops and no additional liquid is fed to the steam generator. At certain intervals of time the piston 62 is lowered by the clock 61 for a determined time, then the pressure liquid flows out of the pipe 64 into the space 66. The piston 63 rises and the liquid contained in the space 65 can get into the discharge pipe 67. The rod 42 and the control arm of the rheostat 41 are raised, the motor 39 is set in operation and additional liquid is fed to the steam generator by means of the pump 35.

It will be understood that the invention is not only applicable to generators of the type having a single water-tube as described above but may be also applied to those employing several tubes through which the medium passes parallel from the inlet end to the outlet end of the generator, these tubes being fired by a common furnace and constituting a single generator. Though it is then preferred to provide means in accordance with the invention respectively associated with each individual tube, the precipitate may be removed from all the tubes by means common to them all. Thus, for example, the tubes may all communicate with a single trap or filter so that the solid ingredients precipitated in all the tubes during normal working can be washed away or discharged from the trap or filter. The question whether separate means for removing precipitate is provided for each tube or whether means common to all the tubes are provided, depends largely on whether each tube is or is not furnished with a separate feed device for the normal supply of working medium or whether a common feed device is provided for all the tubes. If desired there may be arranged in accordance with the invention more than one device at different points of the tube length for removing precipitate, this being particularly advantageous in cases where precipitation does not tend to take place only in one zone within the tube.

I claim:

1. The method of removing impurities introduced in the tubes of steam generators of the once-through type by feed water, which comprises heating the water fed to the generator to the boiling point in a first zone of the tube, gradually converting the water to saturated steam in a second zone of the tube with resultant precipitation therein of impurities which tend to adhere to the walls of the tube, superheating the steam in a third zone of the tube, and periodically increasing the rate of feed of the liquid to the tube to advance along the tube the zone where said impurities normally tend to adhere, utilizing the flow of water during the period of increased feed to loosen said impurities from the tube walls, and removing loosened impurities from the working medium flowing through the tube.

2. The method of removing impurities introduced in the tubes of steam generators of the once-through type by feed water, which comprises heating the water fed to the generator to the boiling point in a first zone of the tube, gradually converting the water to saturated steam in a second zone of the tube with resultant precipitation therein of impurities which tend to adhere to the walls of the tube, superheating the steam in a third zone of the tube, periodically increasing the rate of feed of the liquid to the tube to advance along the tube the zone where said impurities normally tend to adhere, utilizing the flow of water during the period of increased feed to loosen said impurities from the tube walls, and withdrawing the excess liquid due to the increased rate of feed together with the impurities loosened from the tube walls from the tube at a point beyond the zone where the impurities normally tend to adhere to the tube walls.

3. In a steam generator of the once-through type, the combination of at least one tube supplied with feed water at one end thereof and delivering superheated steam at the other end, said tube having a liquid heating zone, a zone in which liquid is gradually evaporated and a superheating zone, a device located at a point beyond that where vaporization of the water normally begins for arresting solids in the tube, a separating device in the tube located at a point beyond the arresting device, a drain pipe leading from said separating device, means for advancing temporarily the precipitating zone by increasing temporarily the quantity of feed water supplied to the tube and for opening the drain pipe from the separating device.

4. In a steam generator of the once-through type, the combination of at least one tube supplied with feed water at one end thereof and delivering superheated steam at the other end, said tube having a liquid heating zone, a zone in which liquid is gradually evaporated and a superheating zone, a pump for delivering feed water to the tube, another pump for delivering temporarily feed water to the tube, a device located at a point beyond that where vaporization of the water normally begins for arresting solids in the tube, a separating device located at a point beyond the arresting device, a drain pipe leading from said separating device and means for controlling the operation of the second pump and for opening the drain pipe from the separating device when the second pump is in action.

HANS CONRAD EGLOFF.